United States Patent
Tan et al.

(10) Patent No.: US 7,542,265 B2
(45) Date of Patent: Jun. 2, 2009

(54) HIGH ENERGY DENSITY CAPACITORS AND METHODS OF MANUFACTURE

(75) Inventors: Qi Tan, Rexford, NY (US); Patricia Chapman Irwin, Altamont, NY (US); Yang Cao, Niskayuna, NY (US); Shihai Zhang, Schenectady, NY (US); Ljubisa Dragoljub Stevanovic, Clifton Park, NY (US)

(73) Assignee: General Electric Company, Niskayuna, NY (US)

(\*) Notice: Subject to any disclaimer, the term of this patent is extended or adjusted under 35 U.S.C. 154(b) by 224 days.

(21) Appl. No.: 11/605,777

(22) Filed: Nov. 28, 2006

(65) Prior Publication Data

US 2008/0123250 A1    May 29, 2008

(51) Int. Cl.
*H01G 4/06* (2006.01)

(52) U.S. Cl. .......... 361/321.1; 361/321.2; 361/311; 361/313; 361/306.1; 361/306.3

(58) Field of Classification Search ......... 361/311–313, 361/321.1, 321.2, 302–305, 321.4, 306.1, 361/306.3, 301.1, 301.4
See application file for complete search history.

(56) References Cited

U.S. PATENT DOCUMENTS

| | | | |
|---|---|---|---|
| 4,323,948 A | 4/1982 | Mercier et al. | |
| 4,843,517 A | 6/1989 | Maruyama et al. | |
| 5,490,035 A * | 2/1996 | Yen et al. | 361/311 |
| 6,184,324 B1 | 2/2001 | Benz et al. | |
| 6,278,356 B1 * | 8/2001 | Lin et al. | 338/309 |
| 6,352,914 B2 * | 3/2002 | Ball et al. | 438/599 |
| 6,594,137 B2 * | 7/2003 | Eriksson | 361/312 |

FOREIGN PATENT DOCUMENTS

| | | |
|---|---|---|
| JP | 58097822 | 10/1983 |
| JP | 61130346 | 6/1986 |

OTHER PUBLICATIONS

S.P.S. Yen et al., "High Dielectric Constant Material Development," California Institute of Technology, IEEE, 1992, pp. 381-386.
JP58097822, English Translation, Oct. 6, 1983.

\* cited by examiner

*Primary Examiner*—Nguyen T Ha
(74) *Attorney, Agent, or Firm*—Penny A. Clarke

(57) ABSTRACT

A capacitor is provided. The capacitor includes a dielectric polymer film comprising a cyanoresin and at least one electrode coupled to the dielectric polymer film. The capacitor has an energy density of at least about 5 J/cc. A method of making a capacitor is provided. The method includes dissolving a cyanoresin in a solvent to form a solution and coating the solution on a substrate to form a dielectric polymer film. The dielectric polymer film has a breakdown strength of at least about 300 kV/mm.

35 Claims, 7 Drawing Sheets

HIGH ENERGY DENSITY CAPACITORS AND METHODS OF MANUFACTURE

BACKGROUND

The invention relates generally to high energy density capacitors and more specifically to polymer-based high energy density capacitors and methods of manufacture.

High energy density capacitors have become increasingly important in various industrial, military, and commercial operations. Polymer based capacitors are lightweight and compact and hence are attractive for various land based and space applications. However, most of the dielectric polymers are characterized by low energy densities (<5 J/cc) and/or have low breakdown strength (<450 kV/mm), which may limit the operating voltage of the capacitor. In order to achieve high energy density, it may be desirable to have both high dielectric constant and high breakdown strength. A trade-off between these two properties may not be advantageous. Most dielectric polymers that exhibit high breakdown strength have low dielectric constant. Therefore, it is important to identify a material with considerably high dielectric constant and high breakdown strength. In spite of considerable effort, there is a need for polymer materials suitable for high energy density capacitors especially for high voltage applications. Further, there is a need for simpler and versatile methods to prepare high quality thin films of such polymer materials for use in high energy density capacitors.

SUMMARY OF THE INVENTION

The present invention meets these and other needs by providing a dielectric polymer having a substantially high dielectric constant and high breakdown strength. Accordingly, one embodiment of the invention is directed to a capacitor. The capacitor includes a dielectric polymer film comprising a cyanoresin. The capacitor further includes at least one electrode coupled to the dielectric polymer film. The capacitor has an energy density of at least about 5 J/cc.

Another embodiment of the invention is directed to a method of making a capacitor. The method includes dissolving a cyanoresin in a solvent to form a solution and coating the solution on a substrate to form a dielectric polymer film. The dielectric polymer film has a breakdown strength of at least about 300 kV/mm.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
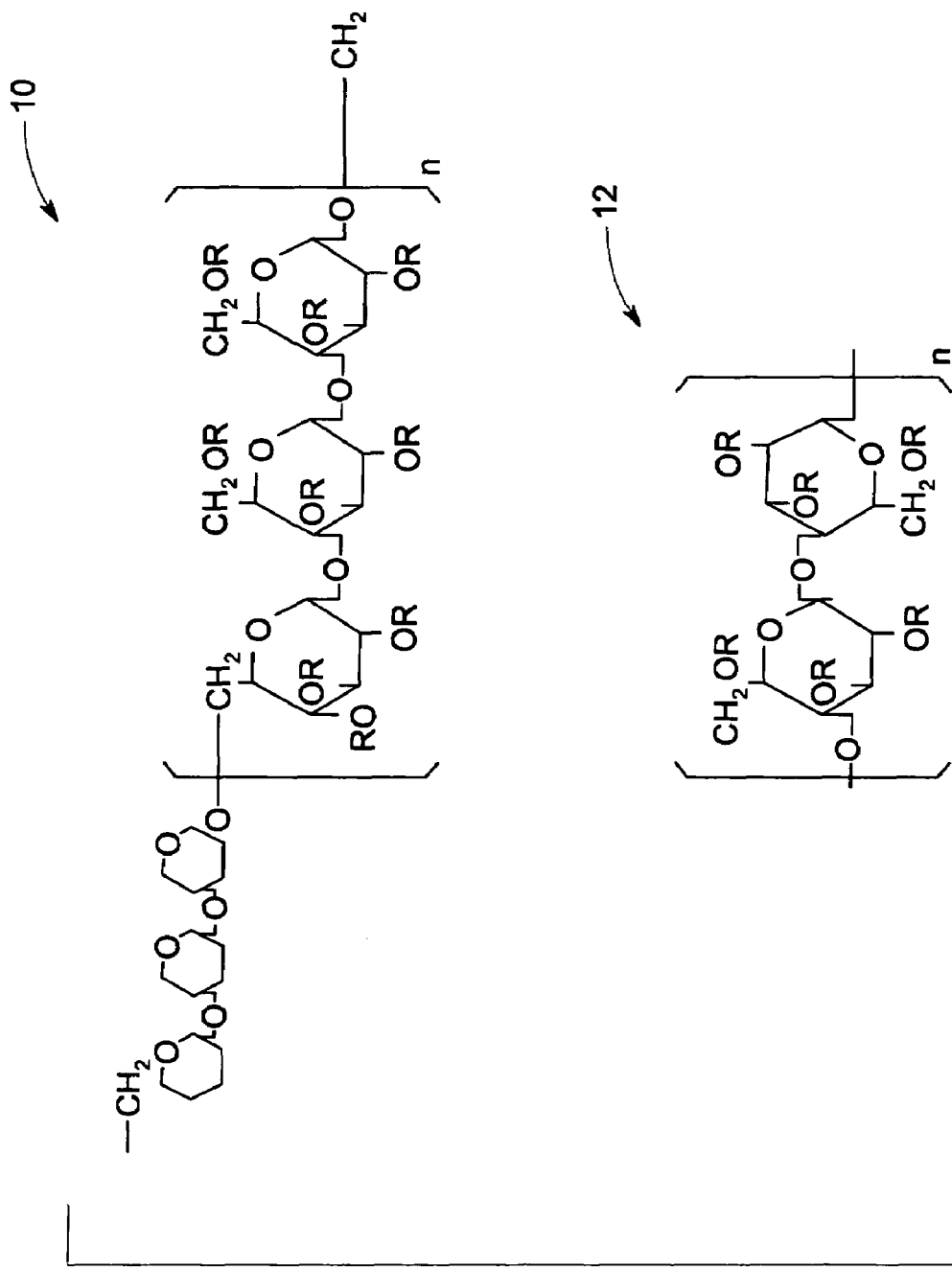
FIG. 1 shows schematic representations of chemical structures of cyanoresins, for use in embodiments of the invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing one embodiment of the invention and are not intended to limit the invention thereto.

Some of the dielectric properties considered herein are dielectric constant, dielectric breakdown voltage or dielectric breakdown strength, and energy density. The "dielectric constant" of a dielectric is a ratio of the capacitance of a capacitor, in which the space between and around the electrodes is filled with the dielectric, to the capacitance of the same configuration of electrodes in a vacuum. As used herein, "dielectric breakdown voltage" refers to a measure of dielectric breakdown resistance of a dielectric material under an applied AC or DC voltage. The applied voltage divided by the thickness of the dielectric material, prior to breakdown, gives the breakdown voltage. It is generally measured in units of potential difference over units of length, such as kilovolts per millimeter (kV/mm). The energy density of a capacitor is generally calculated by the equation $E=(½) CV^2$, where C is the capacitance in farads (F), and V is the working voltage of capacitor in volts (V). These relationships may also be expressed as a function of the electric field, E. If the dielectric constant K of the material does not change with the applied electric field E (in V/um), the electric energy $U_E$ (in J/m$^3$) stored in a capacitor can be calculated by $U_E=½ e_0 K E^2$, where $e_0$ is the permittivity of vacuum. The highest electric field that can be applied to a material is called its dielectric breakdown strength.

One embodiment of the invention is directed to a capacitor. The capacitor includes a dielectric polymer film comprising a cyanoresin. The capacitor further includes at least one electrode coupled to the dielectric polymer film. The capacitor of the embodiments is a high energy storage device, having an energy density of at least about 5 J/cc.

The capacitor is not limited to specific cyanoresins. Examples of suitable cyanoresins include, but are not limited to, cyanoethyl pullulan (CR-S resin), cyanoethyl polyvinylalcohol, cyanoethyl hydroxyethyl cellulose (CR-E), and cyanoethyl cellulose (CR-C resin). In one exemplary embodiment, the cyanoresin comprises cyanoethyl cellulose. In another embodiment, the cyanoresin comprises cyanoethyl pullulan. The structures of the repeating unit of the cyanoresins, for use in certain embodiments of the invention, are provided in FIG. 1. Schematic 10 shows the repeating unit of a CR-S resin, and schematic 12 shows the repeat units of a CR-C resin—where R is —$CH_2$—$CH_2$—CN or H, a sufficient amount of the cyano group being present to provide the desired nitrogen content, and R' is —$CH_2$—$CH_2$—OH or H.

The cyanoresins may have an aliphatic, aromatic or an aryloxy backbone. The cyanoresins have a nitrogen content based on CN groups. In certain embodiments, the nitrogen content is about 7% to about 15% by weight, in other embodiments about 9% to about 13% by weight. The cyanoresins are characterized by a viscosity (20% N,N-dimethylformamide or DMF, solution at 20° C.) typically from about 100 centipoise (cP) to about 1000 cP. The CN group has a substantially high dipole moment and a substantially high mobility to reorient under electric fields, and may lead to high dielectric constant. The CR-S resin has a dielectric constant of 19.5, and the CR-C resin has a dielectric constant of 16.5 at room temperature. The high dielectric constant of the cyanoresin combined with its high breakdown strength may facilitate high energy storage.

Cyanoresins and their blends have been used as dielectric materials. However, their breakdown strength has been reported to be below 200 kV/mm. The inventors have studied these resins, processed high quality films of these resins, and achieved high breakdown strength. Moreover, pure cyanoresin films such as CR-C and CR-E are reported to be highly brittle and hence conventionally, cyanoresins are used as blends with other polymers. The inventors have discovered that unexpectedly high breakdown strength may be achieved by depositing high quality thin films. A more flexible CR-S film that was not well studied before was discovered to be a suitable polymer in terms of properties and processing. The details of film processing and the results are discussed in embodiments below.

In certain embodiments, the dielectric polymer film has a thickness in a range from about 0.1 microns to about 50 microns. In a particular embodiment, the dielectric polymer film has a thickness in a range from about 0.1 microns to about 5 microns. As will be discussed in detail below, the dielectric breakdown strength of the polymer film was found to be inversely proportional to the film thickness. Accordingly, the thickness of the polymer film is chosen depending on the required energy density, and the manufacturing feasibility. In certain embodiments, the polymer films may have higher film thicknesses, for example, in a range from about 3 microns to about 50 microns.

The dielectric polymer film further comprises a plurality of filler particles dispersed in a cyanoresin matrix. The filler particles may contribute positively towards the dielectric constant of the polymer film, and hence may be advantageously utilized. In one embodiment, the filler particles comprise a ceramic. Examples of suitable ceramics include, but are not limited to alumina, titania, zirconia, magnesia, zinc oxide, cesium oxide, yttria, silica, barium titanate, strontium titanate, lead zirconate, lead zirconate titanate, and various combinations of these. In an exemplary embodiment, the filler particles comprise alumina. In another exemplary embodiment, the filler particles comprise titania. These filler particles were found to increase the dielectric constant and hence the energy storage capacity, while maintaining all other high performance parameters such as resistivity, loss factor, and breakdown voltage.

The filler particles are characterized by a mean particle size in a range from about 5 nanometers to about 200 nanometers. In one embodiment, the mean particle size is in a range from about 5 nanometers to about 100 nanometers. The filler particles are present at an appropriate amount. Typically, the fraction of the filler particles is less than about 50 weight percent of the weight of the dielectric polymer film. In one embodiment, the fraction for the filler particles is in a range from about 0.1 weight percent to about 10 weight percent of the dielectric polymer film. In one embodiment, the fraction for the filler particles is in a range from about 0.1 weight percent to about 5 weight percent of the dielectric polymer film. The particle size and the weight percent of filler particles may affect the film forming capability and hence may be optimized appropriately.

As will be discussed in detail below, the dielectric breakdown strength of the polymer may be in part controlled by the film composition, film thickness, and the quality of the film—defined by surface defects, their disposition, surface chemical modification, and surface coating. Typically, for general embodiments of the invention, the dielectric polymer film has a breakdown strength of at least about 300 kV/mm. In one embodiment, the dielectric polymer film has a breakdown strength in a range from about 400 kV/mm to about 1500 kV/mm. In another embodiment, the dielectric polymer film has a breakdown strength in a range from about 500 kV/mm to about 1000 kV/mm. This represents a significant improvement over the prior art materials.

Substantially high dielectric constant and high breakdown strength of the polymer films of the embodiments facilitate high energy storage for the capacitors. In one embodiment, the energy density of the capacitor is at least about 5 J/cubic centimeter (cc). In another embodiment, the energy density of the capacitor is at least about 10 J/cc. In yet another embodiment, the energy density of the capacitor is at least about 20 J/cc. In yet another embodiment, the energy density of the capacitor is at least about 30 J/cc.

The capacitor may optionally include a capping layer disposed on the dielectric polymer film. Examples of suitable capping layer materials include, but are not limited to, polycarbonate, cellulose acetate, polyetherimide, fluoropolymer, parylene, acrylate, silicon oxide, silcon nitride, and polyvinylidene fluoride. For particular embodiments, the capping layer has a thickness of less than about 10% of a thickness of the dielectric polymer film. The capping layer may help in closing or mitigating surface defects and hence may improve the breakdown strength of the polymer film.

In an exemplary embodiment, the capacitor includes a dielectric cyanoresin film having a breakdown strength of at least about 300 kV/mm and a thickness less than about 3 microns. The capacitor further includes an electrode coupled to the dielectric cyanoresin film, wherein the capacitor has an energy density of at least about 5 J/cc. The high energy density of the capacitors of the embodiments may be attractive for numerous land-based and space applications. Especially attractive are pulsed power applications such as electric armors, electric guns, particle beam accelerators, high power microwave sources, ballistic missile applications, and telecommunication devices such as cell phones, and pagers. Because of their small volume, light weight, high reliability, and high energy density, these capacitors may be suitable for hybrid electric vehicles—including electric power steering, pre-heating of catalytic converters, electrically activated air conditioners, and the like.

Figure 2:
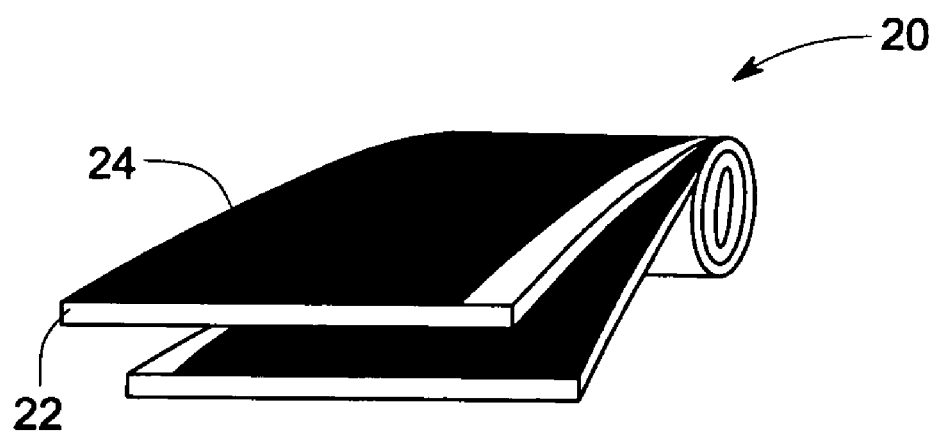
FIG. 2 illustrates a wound capacitor embodiment of the invention.
Figure 3:
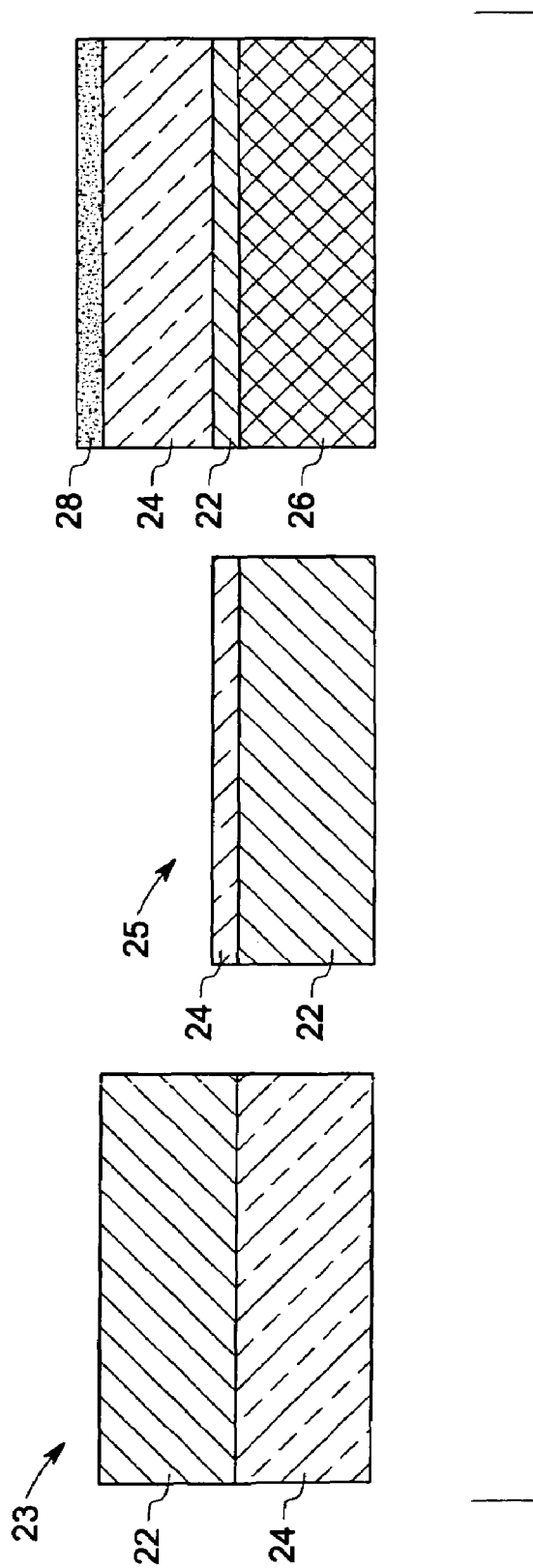
FIG. 3 illustrates a film and foil, a metallized film, and a carrier supported film embodiments of the invention.
Figure 4:
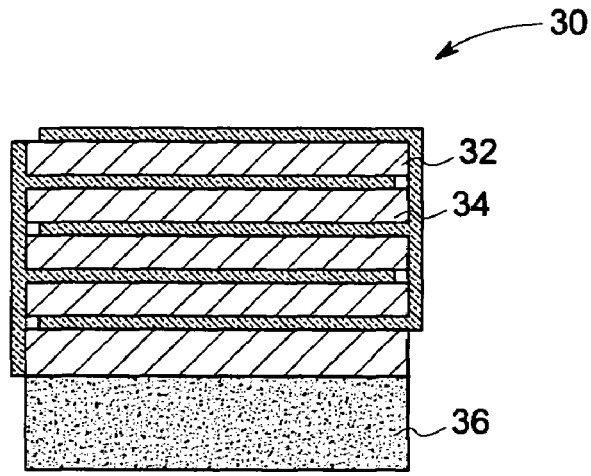
FIG. 4 illustrates a multi-layer capacitor embodiment of the invention.

The capacitors of the embodiments may have any suitable design. In certain embodiments, the capacitor is a wound capacitor such as a wound capacitor 20 shown in FIG. 2. In such embodiments, the dielectric polymer film 22 and the electrode layer 24 are wound to form a wound capacitor. For certain embodiments, a film and foil arrangement 23 is used, as indicated for example in FIG. 3. For other embodiments, a metallized film arrangement 25 is employed, as indicated for example in FIG. 3. When the dielectric film is substantially thin, typically the dielectric film is deposited onto a carrier substrate 26 such as a film, a thin metal foil, or a silicon wafer for support, as shown in FIG. 3. Additionally, the capacitor may include one or more capping layers 28. Typically the electrode layer 24 may comprise a conducting polymer or a metal. Commonly used metals include aluminum, stainless steel, titanium, zinc, and copper. The electrode layer is typically thin, in the order of 50 Å to 500 Å. In other embodiments, the capacitor comprises a multilayer capacitor 30 as shown, for example, in FIG. 4. In such embodiments, a number of dielectric polymer layers 32 and electrode layers 34 are alternately arranged to form a multilayer capacitor. For the illustrated embodiment, the multilayer capacitor further includes a substrate 36.

Figure 5:
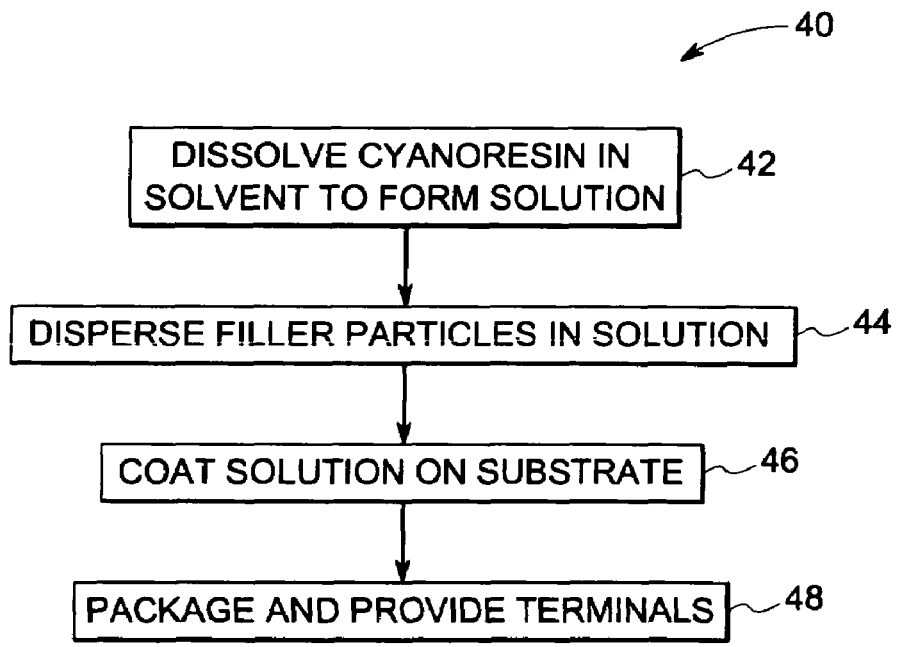
FIG. 5 is a flow chart of a method of forming a capacitor, according to one embodiment of the invention.

A method of making a capacitor has been developed in accordance with embodiments of the invention. FIG. 5 shows a flow chart of a method 40 for making a capacitor, according to one embodiment of the invention. The method 40 includes the steps of dissolving a cyanoresin in a solvent to form a solution, in step 42; and coating the solution on a substrate to form a dielectric polymer film in step 46. The method may include an additional optional step of dispersing filler particles in the solution prior to performing the coating step 46. Further, the method may include packaging and providing terminals at step 48. The dielectric polymer film has a breakdown strength of at least about 300 kV/mm.

As discussed in detail above, any suitable cyanoresin may be used. Examples of suitable cyanoresins include, but are not limited to, cyanoethyl pullulan, cyanoethyl polyvinylalcohol, cyanoethyl hydroxyethyl cellulose, and cyanoethyl cellulose.

In step 42, the cyanoresin is dissolved in any suitable solvent. In particular embodiments, the solvent is selected from the group consisting of acetone, acetonitrile, cyclohexanone, furfuryl alcohol, tetrahydrofurfuryl alcohol, methyl acetoacetate, nitromethane, N,N-dimethylformamide (DMF), N-methyl-2-pyrrolidone (NMP), butyrolactone, propylene carbonate, and various combinations of these. In an exemplary embodiment, the solvent comprises N,N-dimethylformamide.

The polymer film may further comprise a plurality of filler particles, as discussed in detail in the capacitor embodiments. In such embodiments, the method further optionally includes at step 44, dispersing filler particles in the solution prior to performing the coating step 46. Examples of suitable fillers include, but are not limited to, alumina, titania, zirconia, magnesia, zinc oxide, casium oxide, yttria, silica, barium titanate, barium strontium titanate, lead zirconate, and lead zirconate titanate.

The solution comprising the cyanoresin is coated by any suitable coating processes known in the art, in step 46. Examples of suitable coating processes include, but are not limited to, casting, dip coating, spin coating, chemical vapor deposition, melt extrusion, and physical vapor deposition such as sputtering. Typically, the dielectric polymer film has a thickness of less than about 5 microns. When the film thickness is substantially small, solution based coating techniques such as spin coating or dip coating may be used. In an exemplary embodiment, the coating step comprises a spin coating process. In a typical spin coating process, the prepared solution is dropped onto a substrate and extra solution is spun out by spinning at high speed for several seconds. As known in the art, a longer spin time would likely involve moisture and degrade film quality. Accordingly, the spinning parameters are optimized. After coating, the sample may be heated to remove the solvents used. Thickness and the uniformity of films are determined by solution viscosity, spin speed, and spin time, and the number of layers deposited.

When the film thickness is substantially small, the film is coated on to a carrier. The inventors have demonstrated that it is possible to control a thickness variation across the dielectric polymer film to less than about 5%. The film thickness and uniformity may be controlled in part through solvent selection, solution viscosity, and various other coating parameters as known in the art. The coating process may be followed by a heating step to remove the solvents used in the coating solutions.

According to the embodiments of the invention, it is discovered that the quality of the polymer film may be improved by controlling the deposition conditions. For example, by performing the coating processes in a clean room environment, high quality thin films may be obtained. The cyanoresin films processed by the above processes showed unexpectedly high breakdown strength. In one embodiment, the dielectric polymer film has a breakdown strength of at least about 300 kV/mm. In a particular embodiment, the dielectric polymer film has a breakdown strength in a range from about 300 kV/mm to about 1000 kV/mm.

Following the coating process, an electrode may be disposed onto a surface of the polymer film. The electrode may comprise a metallic electrode or a conducting polymer. Examples of typically used metals are aluminum, zinc, copper and the like. The electrode is deposited by any known coating technique in the art. Examples of suitable coating processes include, but are not limited to, sputtering, electrochemical deposition, and evaporation deposition. The method may further comprise disposing one or more capping layers on a surface of the polymer dielectric film. For particular embodiments, the capping layer comprises a material selected from the group consisting of polycarbonate, cellulose acetate, polyetherimide, acrylate, silicon oxide, silcon nitride, polyvinylidene fluoride, and various combinations of these. The capping layer may be deposited prior to or following the electrode deposition. One skilled in the art would be able to choose the capping layer material and the coating process based on the specific application.

According to the embodiments of the invention, it is discovered that the performance of the polymer film may be improved by disposing a functional layer on the surface of the polymer dielectric film. The method 40 may comprise an optional step of disposing a functional layer on the surface of the polymer dielectric film. The functional layer comprises a unit selected from the group consisting of fluorine, oxygen, air, nitrogen, and argon. In certain embodiments, the functionalization of the polymer film is achieved by plasma treating the polymer film surface in an oxygen or a fluorine enriched atmosphere. In an exemplary embodiment, the polymer film is plasma treated in a fluorinated atmosphere, for example in carbon tetrafluoride.

Plasma treatment on a surface generally refers to a plasma reaction that either results in modification of a molecular structure of the surface or atomic substitution. In an exemplary embodiment, plasma surface treatment used herein includes plasma surface treatment with fluorinated species such as carbon tetrafluoride ($CF_4$) that induces substitution of hydrogen atoms in the surface with fluorine atoms. This enables creation of charge traps provided by active anions on the film surface resulting in greater chemical and electrical stability than in existing film capacitors. It is also believed that the treatment process may at least partially refine or smooth the surface of the film, resulting in more uniform distribution of charge during operation of the resulting capacitor, thereby reducing the potential for localized breakdown and failure. In another example, the plasma treatment process may include oxygen plasma treatment.

The method 40 further comprises packaging the capacitor including winding or laminating the layers and providing terminals for applying charge to the wound layers in step 48.

The following example describes the preparation method for making a cyanoresin film by solution casting.

EXAMPLE 1

Figure 6:
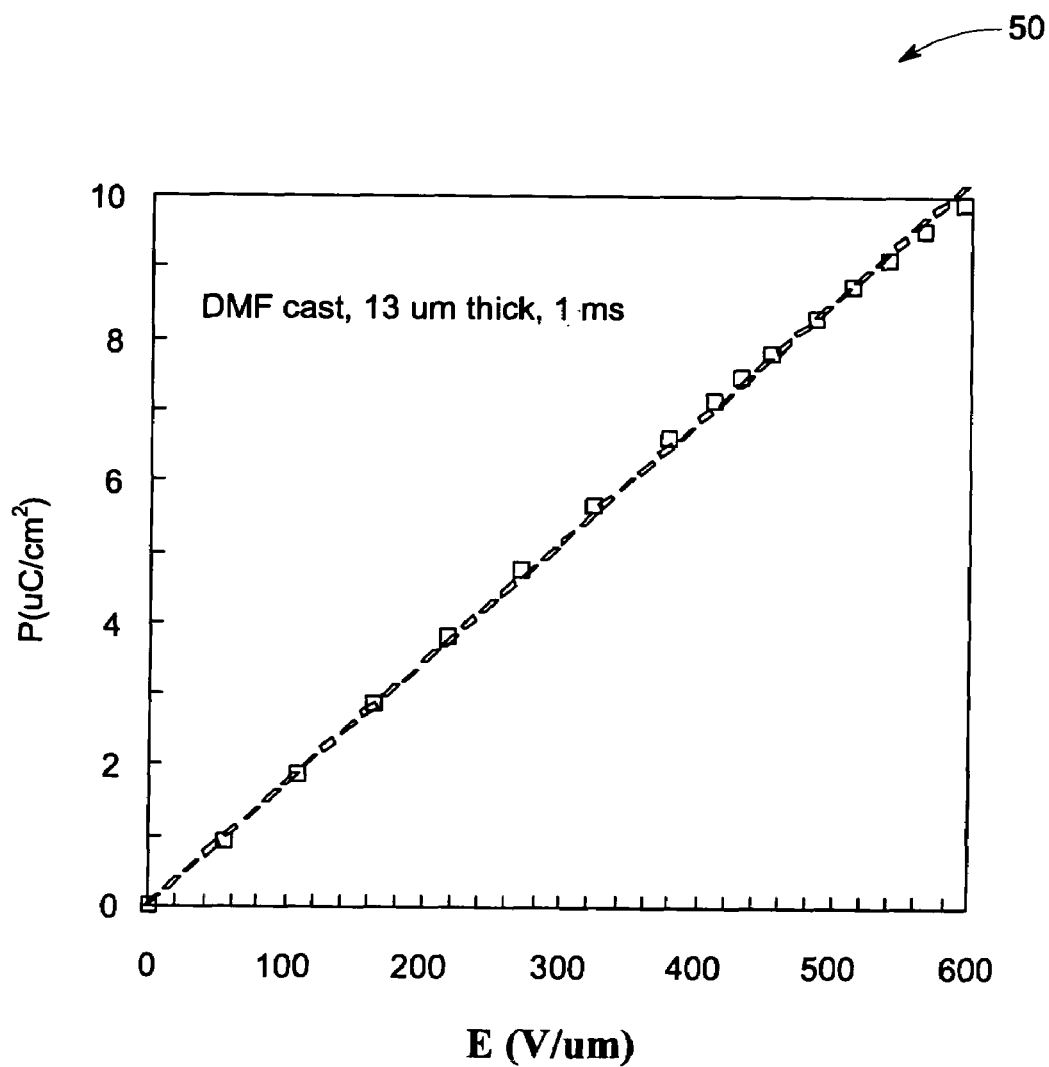
FIG. 6 is a plot of charge density plotted as a function of voltage applied for a sample cyanoresin film.

10 grams of cyanoethyl pullulan (CR-S) powder was added into 40 grams of N,N-dimethylformamide (DMF) to prepare a solution with 10% polymer by weight. The solution was stirred at room temperature with a magnetic stirrer for two hours to dissolve the CR-S polymer. The solution was then cast on a polished ferrous plate and dried at 100° C. in a vacuum oven overnight. The thickness of the deposited film was about 13 micrometers. For polarization (charge density) measurement, a circular platinum electrode was deposited on top of the film using an Emitech K575X sputtering machine. The diameter of the platinum electrode was 4 mm, and the original steel plate was used as the bottom electrode. Polarization measurements were then performed with a 1-ms triangular waveform. FIG. 6 shows typical charge density versus electric field relationship for the resulting capacitor. As indicated in FIG. 6, the charge density was roughly proportional to the applied field strength, suggesting that CR-S is a linear dielectric (plot 50). The highest voltage that could be applied on the DMF-cast 13 µm film was 592 V/µm, and the corresponding charge density was 9.907 µC/cm². Since CR-S is a linear dielectric, the energy density E was calculated by $E=(\frac{1}{2})CV^2=30$ J/cm³.

EXAMPLE 2

Solution Cast Free-standing CR Films 10 grams of CR-S powder was added into 40 grams of DMF to prepare a solution with 10% polymer by weight. The solution was stirred at room temperature with a magnetic stirrer for two hours to dissolve the CR-S polymer. The solution was then cast on a clean glass slide and dried at 100° C. for two hours. The CR-S film was then peeled off from the glass slide and further dried in a vacuum oven overnight. The thickness of the free-standing film was about 18-33 micrometers. Dielectric breakdown strength was then measured following ASTM D149 (method A). The top electrode was a stainless steel ball with diameter of ¼ inch, and the bottom electrode was a stainless steel plate. The film was immersed into clean insulation mineral oil, and direct current (DC) voltage was applied at a ramp rate of 500 V/s until the sample failed. The mean, median, and maximum dielectric breakdown strength were 419, 430, and 574 V/mm, respectively, and the corresponding stored energy density were 14.8, 15.5, and 27.7 J/cc, respectively.

Figure 7:
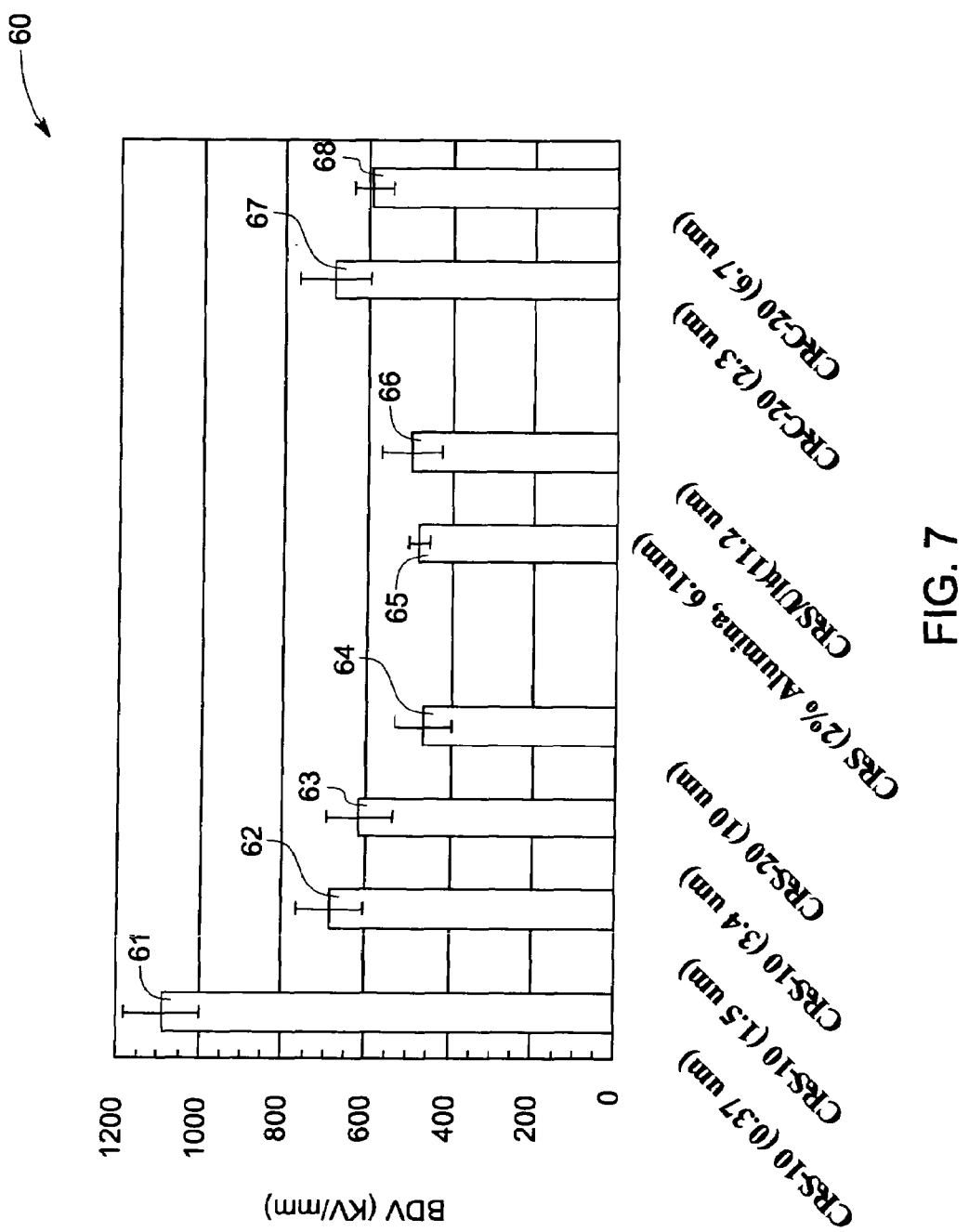
FIG. 7 is a plot of DC breakdown strength for different spin coat cyanoresin samples.

FIG. 7 shows a plot (plot 60) of DC break down strength for different samples. The samples were obtained by spin coating cyanoresin polymers on silicon wafers, processed under identical conditions. Bars 61, 62, 63, and 64 are for CR-S polymer films of different thicknesses. Bar 65 is for a CR-S polymer film with nanosized alumina filler particles. Bar 66 is for a CR-S polymer film with a polyetherimide capping layer. Bars 67 and 68 are for CR-C polymer films of different thicknesses. It is clear from the figure that films with filler particles and capping layers show breakdown strength of at least about 400 kV/mm.

Figure 8:
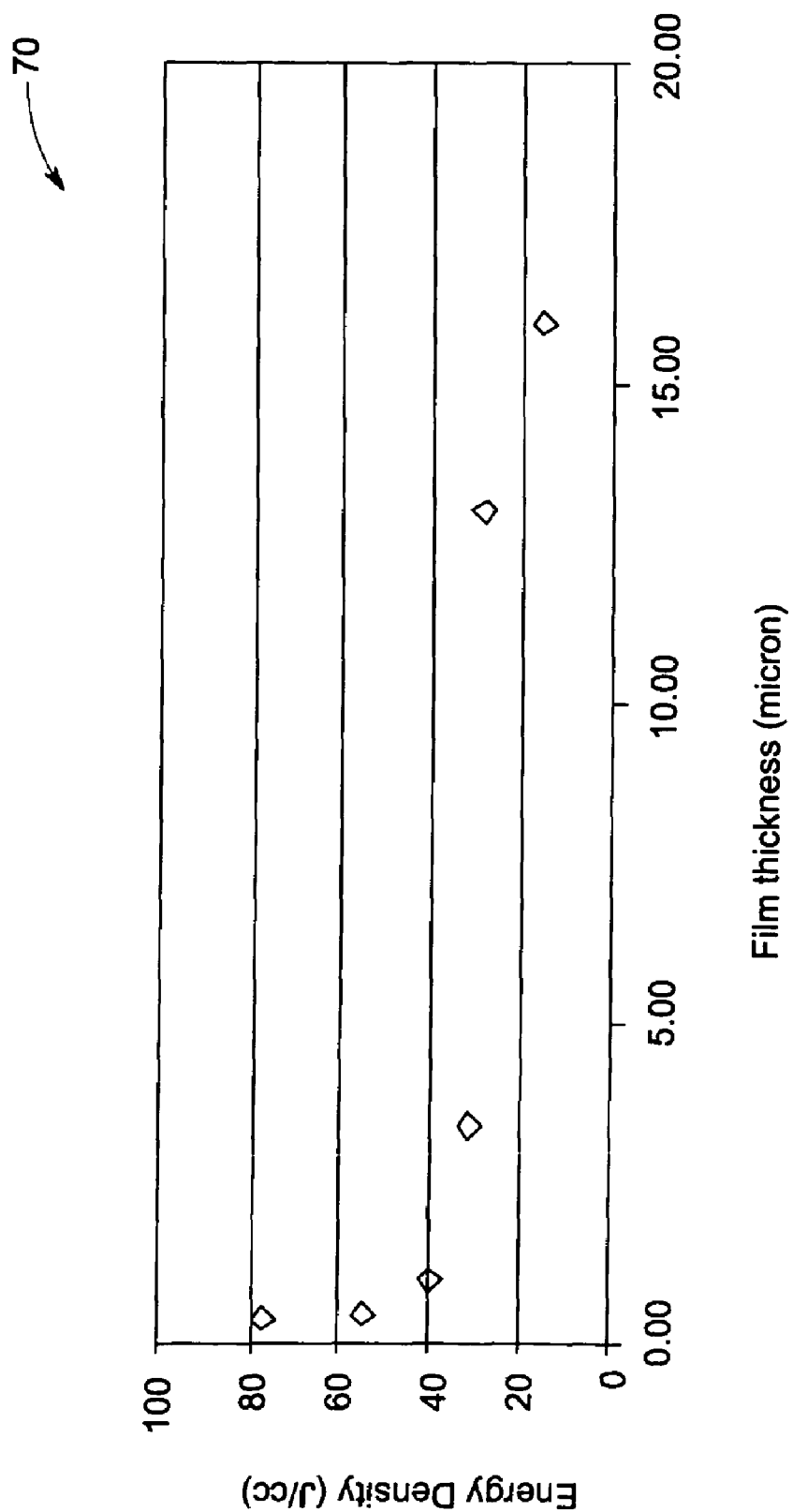
FIG. 8 is a plot of energy density as a function of film thickness for cyanoresin films.

FIG. 8 is a plot 70 of energy density as a function of film thickness. It is clear from the plot that the polymer films comprising cyanoresins exhibit increase in energy density with decrease in film thickness.

As mentioned above, surface defects may cause scattering of breakdown voltages in a dielectric, resulting in varying breakdown voltages at various locations in a capacitor, leading to lowering of the overall breakdown voltage of the capacitor. Processing of high quality cyanoresin films described hereinabove provides unexpectedly high dielectric breakdown strength. This facilitates the fabrication of high energy density polymer based-capacitors.

The aforementioned embodiments present clear advantages over existing capacitors and methods for making such capacitors. For example, it has been found the capacitors made by the foregoing polymer films offer increased dielectric breakdown voltage, increased energy storage, and extended life, while maintaining all other high performance parameters; resistivity, loss factor, and discharge efficiency. Conventionally known capacitors based on cyanoresins have shown low breakdown strength and low mechanical strength (brittle).

While only certain features of the invention have been illustrated and described herein, many modifications and changes will occur to those skilled in the art. It is, therefore, to be understood that the appended claims are intended to cover all such modifications and changes as fall within the true spirit of the invention. It should be understood that though the above embodiments are discussed with respect to a capacitor, the embodiments of the invention may be utilized in any other electric and electronic device, in which excellent dielectric properties of a polymer material are essentially beneficial.

The invention claimed is:

1. A capacitor comprising:
    a dielectric polymer film comprising a cyanoresin; and
    at least one electrode coupled to the dielectric polymer film, wherein the capacitor has an energy density of at least about 5 J/cc, and wherein the dielectric polymer film further comprises a plurality of filler particles dispersed in a cyanoresin matrix.

2. The capacitor of claim 1, wherein the cyanoresin comprises a polymer selected from the group consisting of cyanoethyl pullulan, cyanoethyl polyvinylalcohol, cyanoethyl hydroxyethyl cellulose, and a cyanoethyl cellulose.

3. The capacitor of claim 1, wherein the dielectric polymer film has a thickness in a range from about 0.1 microns to about 50 microns.

4. The capacitor of claim 3, wherein the dielectric polymer film has a thickness in a range from about 0.1 microns to about 10 microns.

5. The capacitor of claim 1, wherein the dielectric polymer film has a thickness in a range from about 1 microns to about 20 microns.

6. The capacitor of claim 1, wherein the filler particles comprise a ceramic.

7. The capacitor of claim 6, wherein the ceramic comprises a material selected from the group consisting of alumina, titania, zirconia, magnesia, zinc oxide, casium oxide, yttria, silica, barium titanate, strontium titanate, lead zirconate, and lead zirconate titanate.

8. The capacitor of claim 1, wherein the filler particles are characterized by a mean particle size in a range from about 5 nanometers to about 200 nanometers.

9. The capacitor of claim 8, wherein the mean particle size is in a range from about 5 nanometers to about 100 nanometers.

10. The capacitor of claim 1, wherein the energy density is at least about 30 J/cc.

11. The capacitor of claim 1, wherein the dielectric polymer film and the electrode are wound to form a wound capacitor.

12. The capacitor of claim 1, comprising a plurality of dielectric polymer layers and a plurality of electrodes, wherein the dielectric polymer layers and the electrodes are alternately arranged to form a multilayer capacitor.

13. The capacitor of claim 1, wherein a fraction of the filler particles is less than about 10 weight percent of the dielectric polymer film.

14. The capacitor of claim 13, wherein the fraction for the filler particles is in a range from about 0.1 weight percent to about 5 weight percent of the dielectric polymer film.

15. A capacitor comprising:
a dielectric polymer film comprising a cyanoresin; and
at least one electrode coupled to the dielectric polymer film, wherein the capacitor has an energy density of at least about 5 J/cc, wherein the dielectric polymer film has a breakdown strength of at least about 300 kV/mm.

16. The capacitor of claim 15, wherein the dielectric polymer film has a breakdown strength in a range from about 400 kV/mm to about 1500 kV/mm.

17. The capacitor of claim 16, wherein the dielectric polymer film has a breakdown strength in a range from about 500 kV/mm to about 1000 kV/mm.

18. A capacitor comprising:
a dielectric polymer film comprising a cyanoresin;
at least one electrode coupled to the dielectric polymer film, wherein the capacitor has an energy density of at least about 5 J/cc; and
a capping layer disposed on the dielectric polymer film, wherein the capping layer comprises a material selected from the group consisting of polycarbonate, cellulose acetate, polyetherimide, fluoropolymer, parylene, acrylate, silicon oxide, silcon nitride, and polyvinylidene fluoride, and wherein the capping layer has a thickness of less than about 10% of a thickness of the dielectric polymer film.

19. A capacitor comprising:
a dielectric cyanoresin film having a breakdown strength of at least about 300 kV/mm, and a thickness less than about 3 microns; and
an electrode coupled to the dielectric cyanoresin film, wherein the capacitor has an energy density of at least about 5 J/cc.

20. A method of making a capacitor, the method comprising:
dissolving a cyanoresin in a solvent to form a solution; and
coating the solution on a substrate to form a dielectric polymer film, wherein the dielectric polymer film has a breakdown strength of at least about 300 kV/mm.

21. The method of claim 20, wherein the cyanoresin comprises a polymer selected from the group consisting of a cyanoethyl pullulan, cyanoethyl polyvinylalcohol, cyanoethyl hydroxyethyl cellulose, and a cyanoethyl cellulose.

22. The method of claim 20, wherein the dielectric polymer film has a breakdown strength in a range from about 300 kV/mm to about 1000 kV/mm.

23. The method of claim 20, further comprising controlling a thickness variation across the dielectric polymer film to less than about 5%.

24. The method of claim 20, further comprising disposing an electrode on a surface of the polymer dielectric film.

25. The method of claim 24, wherein the electrode is disposed by performing a process selected from the group consisting of sputtering, physical vapour deposition, and electrochemical deposition.

26. The method of claim 20, further comprising disposing a capping layer on a surface of the polymer dielectric film.

27. The method of claim 26, wherein the capping layer comprises a material selected from the group consisting of polycarbonate, cellulose acetate, polyetherimide, acrylate, silicon oxide, silcon nitride, and polyvinylidene fluoride.

28. The method of claim 20, further comprising disposing a functional layer on a surface of the polymer dielectric film.

29. The method of claim 28, wherein the functional layer comprises a unit selected from the group consisting of fluorine and oxygen.

30. The method of claim 20, wherein the dielectric polymer film has a thickness of less than about 5 microns.

31. The method of claim 20, further comprising loading a plurality of filler particles in the solution prior to performing the coating step.

32. The method of claim 31, wherein the filler particles comprise a material selected from the group consisting of alumina, titania, zirconia, magnesia, zinc oxide, casium oxide, yttria, silica, barium titanate, strontium titanate, lead zirconate, and lead zirconate titanate.

33. The method of claim 20, wherein the solvent is selected from the group consisting of acetone, acetonitrile, cyclohexanone, furfuryl alcohol, tetrahydrofurfuryl alcohol, methyl acetoacetate, nitromethane, N,N-dimethylformamide (DMF), N-methyl-2-pyrrolidone (NMP), butyrolactone, and propylene carbonate.

34. The method of claim 33, wherein the solvent comprises N,N-dimethylformamide.

35. The method of claim 20, wherein coating the solution comprises performing a process selected from the group consisting of casting, dip coating, spin coating, chemical vapor deposition, and sputter deposition, and melt extrusion.

* * * * *